Figure 1:
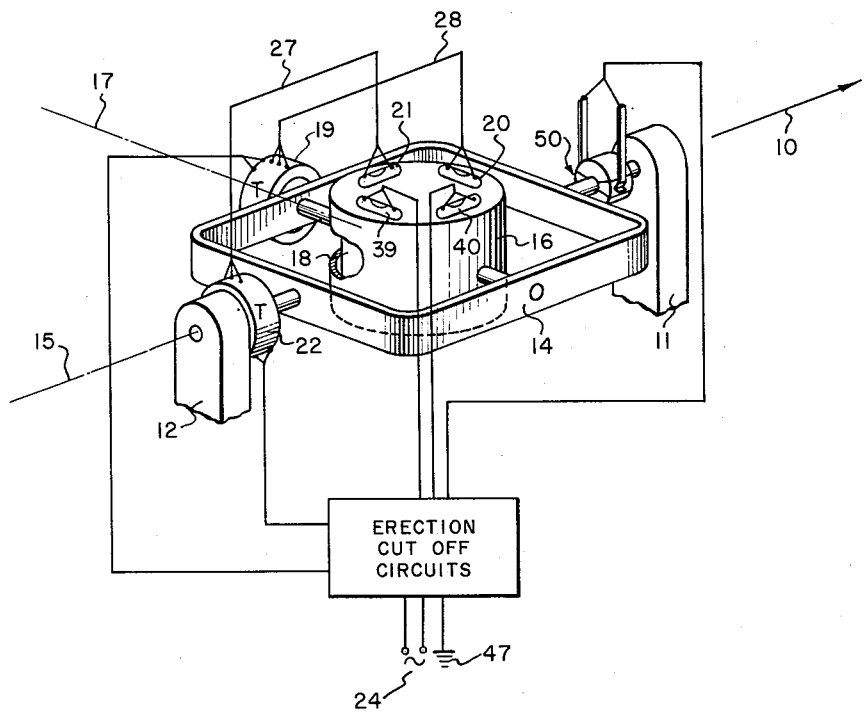

Aug. 8, 1961  R. L. HAMMON  2,995,040
REFERENCE PROVIDING SYSTEM FOR DIRIGIBLE CRAFT
Filed Jan. 28, 1959  2 Sheets-Sheet 1

INVENTOR
ROBERT L. HAMMON
BY Arthur H. Serrell
ATTORNEY

ROLL ERECTION CUT OFF COMPONENTS

PITCH ERECTION CUT OFF COMPONENTS

INVENTOR
ROBERT L. HAMMON
BY
Arthur H. Serrell
ATTORNEY

United States Patent Office 2,995,040
Patented Aug. 8, 1961

2,995,040
REFERENCE PROVIDING SYSTEM FOR DIRIGIBLE CRAFT
Robert L. Hammon, Cocoa Beach, Fla., assignor to Sperry Rand Corporation, Great Neck, N.Y., a corporation of Delaware
Filed Jan. 28, 1959, Ser. No. 789,586
13 Claims. (Cl. 74—5.47)

This invention relates to reference systems for dirigible craft which include a gyroscopic stabilizing element and a slaving or erecting controller that is subject to error during the presence of accelerations of the craft in either fore and aft and/or lateral directions. The subject invention accordingly concerns the problem of the disablement of the normally effective control devices for slaving or erecting the gyro case or stable element of the combination upon the occurrence of such accelerations. Where the control references for the system are gravity responsive devices such as liquid levels or pendulums the influence thereon of acceleration during turns of the craft or changes in its forward speed results in an error which tends to erect the gyroscopic element to a false or apparent vertical. The subject invention concerns the prevention of this error in the system.

The solutions advanced by the prior art to this well-known problem include a means for sensing turns of the craft such as a rate gyro disposed on the craft to detect movement about the yaw axis. In this structure, an off-on switch arm under control of the gyro operates to break the circuit between the slaving controller and the gyro stabilized element. Another cut-off switch is provided in the art whose operation depends on the attitude of the craft with respect to the gyro element about its fore and aft or roll axis. One portion of the switch is fixed to the craft and another portion to the element so that at a predetermined banking attitude of the craft the switch opens. Weight type accelerometers have also been used in this connection, the circuit opening or operative point of such devices depending upon the degree of tilt of the craft from a null condition about its bank axis and/or the rate of movement of the craft about its yaw axis. The improved system includes acceleration sensing devices that are mounted or carried by the gyro element to sense the horizontal components of acceleration influencing the primary reference. The operation of these devices is independent of craft attitude about its bank axis or the turning movement or rate of movement about its yaw axis.

One of the objects of the present invention is to provide a means for disabling or rendering ineffective the normal slaving or erecting controls that is functionally independent of craft attitude, air speed or velocity with respect to the ground.

The subject invention makes use of the fact that an error between the gyroscopic element and its reference and the deflection of the craft's apparent vertical with respect to the gyroscopic element occur at markedly different rates. In the first instance, the drift of a free gyro is produced by the horizontal component of earth's rate, the effect of travel over the earth's spherical surface, and gyro total drift rate. In practice, the sum of these rates seldom exceeds 1° per minute. However, in the other instance, during fore and aft craft accelerations or turns, the apparent vertical with respect to the craft rapidly assumes a new position in relation to the gyroscopic element. For instance, when the craft enters a 20° banked turn, the apparent vertical rapidly deflects 20° if the turn is coordinated. Deflection of the apparent vertical in turns may approach a few hundred degrees per minute. It is noted that this represents the angular rate of change of the acceleration vector in space rather than the craft rate of turn. This transient factor is utilized in the improved system as the differentiated output of an acceleration sensing device mounted on the gyroscopic element. In accordance with the present inventive concepts, the disabling means for the slaving controls of the system is controlled by sequentially operable means initially set in operation by the noted transient factor and subsequently held so conditioned as long as the magnitude of the output of the acceleration sensing device is above a predetermined value. The accelerometers of the improved system may be provided by conventional liquid level devices.

Figure 2:
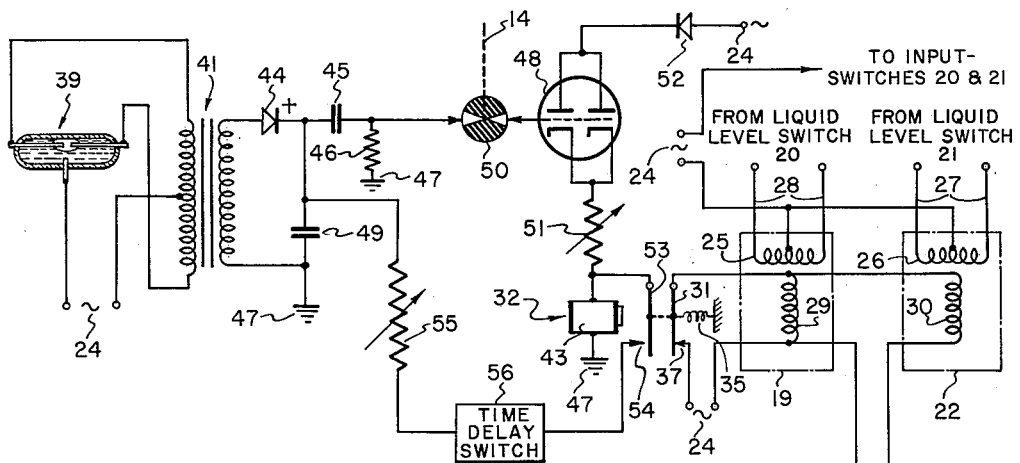
Figure 2:
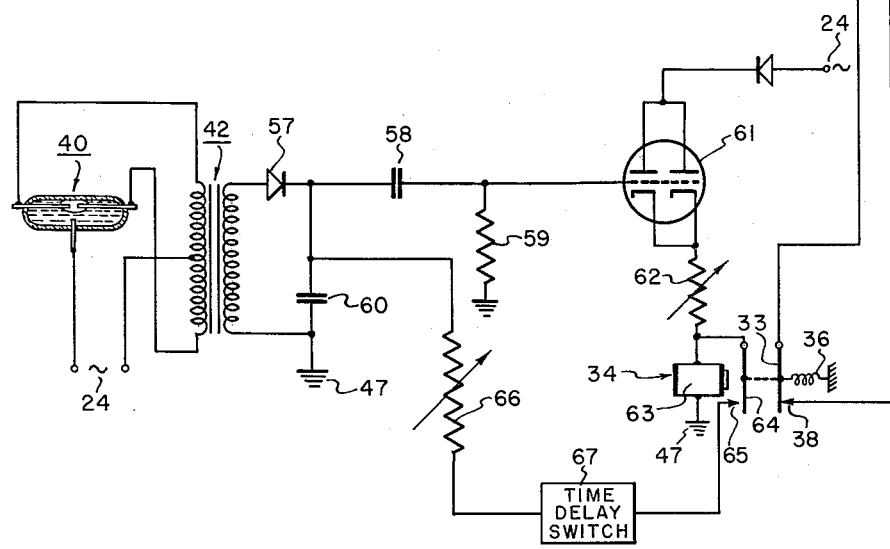

Referring to the drawings showing the preferred form of the invention:

FIG. 1 is a diagrammatic view of the improved reference providing system showing a gyro vertical type of gyroscopic element with conventional gravity responsive reference devices for the same in the form of liquid level switches, and FIG. 2 is a schematic view and wiring diagram showing the electrical connections between the components constituting the improved system.

The illustrative reference system shown in FIG. 1 is provided by a conventional gyro vertical type of gyroscopic instrument that is slaved to or erected by a suitable controller sensitive to the earth's gravitational force. Instruments of this character are utilized in dirigible craft to provide data in accordance with departures of the craft from a level attitude with respect to both its roll and pitch axes. Where the data is translated mechanically, the instrument is direct reading and is known as an artificial horizon. Where the data is provided by suitable pick-offs at the respective axes thereof, the data is transmitted to a remote point and may be utilized to operate a remote indicator or an automatic pilot servomotor. In the drawing, the direction of flight of the craft is indicated by the straight arrow 10.

The gyroscopic components of the system are located in the craft on spaced mounting posts 11 and 12 that are fixed in relation to the craft and may be constituted by the spaced walls of a housing for the instrument. Posts 11 and 12, as shown, include oppositely disposed bearings for the trunnions of a gimbal ring 14 component of the system, the axis 15 of the ring being arranged parallel to or coincident with the fore and aft axis of the craft. The gyroscopic element or rotor case of the combination as indicated at 16 is universally supported by the ring 14 with respect to the craft. As shown, the case 16 is supported by suitable trunnions in bearings on the ring 14 with freedom about a normally horizontal axis 17 perpendicular to axis 15, such axis being located parallel to or coincident with the athwartship axis of the craft when the craft is in a level condition. Axes 17 and 15 constitute the respective minor and major axes of freedom of the universally mounted gyroscopic element 16. The gyroscopic element or rotor case of the combination includes a conventional gyro rotor 18 and spinning means (not shown) for the rotor, the rotor enclosed within the case spinning about a substantially vertical axis whose position is maintained independently of the attitude of the craft by the provided slaving or erecting means for the instrument. In the position of the parts depicted in FIG. 1, it will be understood that the craft in which the gyroscopic components are mounted is flying substantially straight and level as represented by arrow 10. When the craft departs from this condition relative to axis 15, the posts 11, 12 move with the craft about axis 15 with respect to the element 16 as the craft assumes a banked attitude about its roll axis. Like relative movement occurs about axis 17 between the ring 14 and case 16 when the craft assumes a climb or dive attitude.

As shown in FIG. 1, conventional torque motors responsive to the output of liquid level switches provide the gravity responsive means of the system for maintaining the rotor case 16 in an erected condition about axes 15 and 17 with respect to the craft. In this connection, A.C. torque motor 19 at the axis 17 of the instrument is controlled by the output of liquid level switch device 20 in accordance with tilt of the element from a horizontal condition with relation to the roll axis 15 of the system. Likewise, the pitch tilt detector switch or level 21 for the axis 17 controls the operation of the A.C. torque motor 22 at the axis 15 of the system. Switch devices 20 and 21 are provided by conventional three electrode capsules that contain an electrically conductive fluid medium and an insulative air bubble that opens the circuit between the central and spaced output electrodes when the capsules are level. As shown, the levels are fixed to the case 16 so as to detect tilt about the respective axes 17 and 15. The central or input electrode is energized from a suitable source of alternating electrical energy 24, FIG. 2. The control field windings 25 and 26 of the respective torquers 19 and 22 are respectively differentially operated by devices 20 and 21 depending on the sense of tilt of the case 16 and the output electrodes thereof. As shown, leads 27 connect the output electrodes of switch 21 with the winding 26 of torque motor 22. The leads 28 connect the output electrodes of switch 20 with the winding 25 of the torque motor 19. As shown in FIG. 2, the fixed field windings 29 and 30 are normally supplied with energy from source 24 and circuitry to be hereinafter described. The noted components constitute a means for slaving or erecting the gyroscopic element 16 that includes gravity reference means. The influence of acceleration athwartship of the element 16 on reference device 20 and fore and aft of the element 16 on reference device 21 cause the devices to have error outputs that erect the element 16 to an apparent rather than a true vertical. In the erecting means described, the switches 20 and 21 provide electrical output signals that operate the respective torque motors 19 and 22 to slave the gyroscopic element 16 to the earth's reference.

The components constituting the normally ineffective means for disabling the slaving or erecting controls of the improved reference system are shown in FIG. 2. As shown in this figure, the contact assembly 31 of roll cut-off relay 32 and the contact assembly 33 of pitch cut-off relay 34 close an input circuit including source 24 to the fixed field windings 29, 30 of the respective torque motors 19, 22 so the same are conditioned for operation in the normally effective erection controls of the system. Springs 35 and 36 for the respective assemblies 31, 33, normally engage the same with the respective contacts 37, 38. The motor windings 29 and 30 are arranged in the circuit so that with operation of relay 32, the circuit between contact 37 and assembly 31 is broken and the erection controls for both axes 17 and 15 are disabled. Operation of pitch cut-off relay 34 breaks the circuit between assembly 33 and contact 38 and disables only the torque motor 22 effective to control erection of the element 16 about its pitch axis 17.

The roll cut-off components include an acceleration sensing device mounted on the gyroscopic element 16 in the for of a liquid level switch 39 whose output varies in accordance with the influence of the horizontal component of acceleration on the gravity reference element 20. Component 39 may be of the same three electrode type of switch utilized in the erection controlling means to sense tilt of the gyroscopic element about its respective axes 17 and 15. The pitch components of the system include a similar sensing device indicated as switch 40 that is carried by or connected to element 16 to provide an output in accordance with horizontal components of acceleration influencing the gravity switch 21 of the erection system. The arrangement of the sensing devices with respect to the element 16 is shown in FIG. 1, the component 39 providing an electrical output in accordance with acceleration along an axis athwartship of the craft and the component 40 providing an electrical output in accordance with acceleration along an axis fore and aft of the craft. As represented, the devices 39 and 40 are capsules containing a fluid electrolyte, an air bubble, a central electrode connected to electrical source 24 and two oppositely disposed electrodes connected to the ends of the primary winding of respective transformers 41, 42, each of which have a center tapped lead returning to the source 24. The electrical input to the respective transformers is accordingly dependent on the magnitude of the sensed acceleration as influenced by relative displacement of the bubble in the electrolyte of the devices 39 and 40.

Relay 32 of the roll erection cut-off components is operated to disable the torque motors 19 and 22 by the output signal of acceleration sensing device 39. The operating circuit shown in FIG. 2 interconnects the sensing element and the coil 43 of the relay. This circuit includes the secondary winding of step up transformer 41 whose output dependent on sensing device 39 is changed to direct current by a suitable rectifier 44. The rectified output of the transformer is then differentiated by suitable means shown herein as provided by a condenser 45 and a shunting resistor 46 connected to ground 47. The output of the condenser-resistor network whose ripple is smoothed by the condenser 49 is in accordance with the rate of change of the signal of the sensing device 39. The smoothed output of the network is fed the grid of electron tube 48 by way of the closed switch 50. When the rate signal at the grid exceeds a predetermined level, such as corresponds for example to a deflection of the apparent vertical at a rate of 20 degrees per minute, the magnitude of the current passing from the plates to the cathodes of the tube 48 by way of variable resistor 51 to ground 47 through the coil 43 is sufficient to cause the relay to operate to pull the contact assembly 31 away from the contact 37 against the action of spring 35. This function disables the erection means and renders the normally ineffective disabling means effective. The described operating circuit with the differentiating means therein connects the liquid level switch 39 and the relay 32. In an illustrative circuit of this character, the capacity of condenser 45 may extend between the values of .01 and .1 microfarad with the capacity of condenser 49 at .05 microfarad and resistance of resistor 46 at 1 megohm. As shown, energy for tube 48 is supplied from the source 24 by way of a suitable rectifier 52.

The normally closed switch 50 provided in this circuit may be a commutator and brush type switch shown in FIG. 1, where the commutator is fixed to the trunnion of ring 14 and the spaced brushes are fixed in relation to post 11 to move with the craft as the craft moves about its roll or fore and aft axis. The switch operates to open the circuit when the bank attitude of the craft exceeds a predetermined angular relation for example 5 degrees with respect to the element 16 of the gyro vertical. At this point, the brushes of the switch move from the conducting segment portions of the commutator to the nonconducting segment portions to break the circuit.

The roll component relay 32 includes a second contact assembly 53 ganged to assembly 31 whose related contact is indicated at 54. The associated assembly 53 and contact 54 provide a normally open switch in a holding circuit for the normally ineffective disabling means, such circuit being between the sensing device 39 and coil 43 of the relay 32. This circuit is connected to the output side of the rectifier 44 and includes a variable resistor 55 and a suitable time delay switch 56. Switch 56 may be provided by a suitable normally closed thermally operative device that opens the circuit after the lapse of a predetermined time interval of, for example, five minutes. The purpose of this switch is to insure the return of the normally operating erection controls to operation regardless of the magnitude of the output of the sensing device 39. With the relay 32 initially operated by the output of tube 48, the assembly 53 engages contact 54 to close the holding circuit connecting the sensing device 39 to the relay coil 43. The relay 32 of the disabling means is designed to remain effective as long as the magnitude of the output of the sensing device 39 is above a predetermined value such as may correspond to a 1 degree tilt of the gyroscopic element 16. The cut-off controls are disabled when the magnitude of the output of the sensing device 39 goes below the selected value. This re-establishes the normal erection controls about both axis 17 and 15 and returns the disabling means to its normal condition. The relay 32 of the system constitutes a sequentially operable means that is initially conditioned by the output of the differentiating means at a predetermined level to render the disabling means effective and is subsequently conditioned by the output of the acceleration sensing device 39 as long as the magnitude of the output thereof remains above a predetermined value.

The pitch erection cut-off circuits shown in FIG. 2 are similarly effective to control the operation of the relay 34 under the influence of the acceleration sensing device 40 of the system. In this instance, the operation of the disabling means is initiated when the rate of change of the output of the liquid level switch device 40 sensing fore and aft horizontal components of craft acceleration reaches a predetermined cut-off level. The circuit for accomplishing this result includes elements corresponding to the roll cut-off components such as rectifier 57 connected to the secondary of the step-up transformer 42, differentiating network comprising condenser 58 and resistor 59, smoothing condenser 60, electron tube 61, variable resistor 62 and the coil 63 of the relay 34. No cut-off corresponding to switch 50 is provided in this circuit.

The normally open switch contained in the holding circuit of the pitch erection cut-off components is provided by the second contact assembly 64 of relay 34 that is ganged to assembly 33, and biased in open condition with relation to contact 65 by the spring 36. This circuit includes a variable resistor 66 and a time delay switch 67 which may be of the same character as switch 56. The switch 67 functions to assure the re-establishment of the normal pitch erection control to the system after a predetermined time by opening the holding circuit. These components operate in the manner described for the roll components, the relay 34 rendering the disabling means effective when the output of the differentiating means reaches the cut-off level. The disabling means is subsequently held in effective condition as long as the magnitude of the output of the sensing device 40 remains above a predetermined value which may be different than the holding value utilized in the roll holding circuit. For signals below the holding value, the spring 36 is effective to re-establish the pitch erecting controls and open the holding circuit.

The system utilizes the high rate of change of the apparent vertical to initiate the disablement operation as obtained when the craft enters or leaves a banked turn or goes from a level condition to a dive or climb attitude or vice versa. The required signal is at its maximum at the roll in and roll out period and at the initial and final period of a change in altitude condition. Between these points the holding circuit or circuits operate to maintain the required erection controls disabled. The switch 50 is included to prevent intermittent operations of the system under oscillatory yaw flight conditions and to insure restoration of normal erection control after sustained aircraft turns in the presence of gyro drift.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a reference providing system for dirigible craft, a universally supported gyroscopic element having an axis, means for slaving said element with respect to said axis including a reference device, normally ineffective means for disabling said slaving means including an acceleration sensing device carried by the gyroscopic element to provide an output that varies with the influence of the horizontal component of acceleration on the reference device, means for differentiating the output of said sensing device providing a rate of change output, and sequentially operable means for rendering said disabling means effective initially conditioned by the output of said differentiating means at a predetermined level and subsequently conditioned by the output of said acceleration sensing device at a magnitude above a predetermined value.

2. In a reference providing system for dirigible craft, a universally supported gyroscopic element having a normally horizontal axis, means for erecting said element including a gravity reference for detecting tilt of the element about its axis subject to error due to the influence thereon of horizontal components of acceleration, normally ineffective means for disabling said erecting means including an acceleration sensing device carried by the gyroscopic element to provide an output that varies with the horizontal component of acceleration influencing the gravity reference, means for differentiating the output of said sensing device providing a rate of change output, conditioning means connected to said differentiating means for rendering said disabling means effective when the rate output thereof reaches a predetermined level, and holding means connecting the conditioning means to the sensing device operable to maintain said disabling means in effective condition with the magnitude of the output of the sensing device above a predetermined value.

3. In reference providing system for dirigible craft, a gyro vertical having a rotor case with normally horizontal axis, means for erecting said case including a gravity reference carried by the case for detecting tilt about the axis subject to error due to the influence thereon of horizontal components of acceleration, normally ineffective means for disabling said erecting means including an acceleration sensing device connected to the case to provide an output that varies with the horizontal component of acceleration influencing the gravity reference, means receiving the output of said sensing device providing a rate of change output, and a relay initially responsive to the output of said receiving means and subsequently responsive to the output of said sensing device operable to render said disabling means effective.

4. In a reference providing system for dirigible craft, a gyro vertical with electrical erecting means including a torque motor and a tilt detecting gravitationally responsive device connected by a circuit to the motor and providing an electrical output, a relay operable to disable the erecting means having a coil and a pair of ganged contact assemblies one of which provides a normally closed switch, means carried by the gyro vertical for sensing horizontal components of acceleration providing an electrical output, a relay operating circuit with a differentiator therein connecting the acceleration sensing means and the relay coil, and a relay holding circuit between the acceleration sensing means and the relay coil in which the other of the ganged assemblies provides a normally open switch.

5. A system of the character claimed in claim 4, in which said relay operating circuit includes a normally closed switch for opening said circuit when the bank attitude of the craft exceeds a predetermined angular relation with respect to the gyro vertical.

6. A system of the character claimed in claim 4, in which said relay holding circuit includes a normally closed switch for opening said circuit after a predetermined time interval.

7. In a reference system for dirigible craft, a gyro vertical having a rotor case with an axis athwartship of the craft, means including a gravity reference for erecting the case about said axis, normally ineffective means for disabling said erecting means including a liquid level device carried by said case to sense horizontal components of acceleration fore and aft of the craft and provide a corresponding electrical output, means for differentiating the output of said liquid level device providing a rate of change electrical output, and sequentially operable means for rendering said disabling means effective initially conditioned by the output of said differentiating means at a predetermined level and subsequently conditioned by the output of said liquid level device at a magnitude above a predetermined value.

8. In a reference system for dirigible craft, a gyro vertical with a universally supported rotor case having electrical erecting means including a torque motor and a gravitationally responsive device providing an electrical output in accordance with tilt of the case about an axis fore and aft of the craft and connected by a circuit to the motor, a relay operable to disable the erecting means having a coil and a pair of ganged contact assemblies one of which provides a normally closed switch, a liquid level element mounted on the case to sense horizontal components of acceleration athwartship of the craft and provide an electrical output, a relay operating circuit with a differentiator therein connecting the liquid level element and the realy coil, and a relay holding circuit between the liquid level element and the relay coil in which the other of the ganged assemblies provides a normally open switch.

9. A system of the character claimed in claim 8, in which said relay operating circuit includes a normally closed switch for opening said circuit when the attitude of the craft about its fore and aft axis exceeds a predetermined angular relation with respect to the rotor case.

10. A system of the character claimed in claim 8, in which said relay holding circuit includes a normally closed time delay switch.

11. In a reference system for dirigible craft, a gyro vertical having a rotor case with an axis fore and aft of the craft, means including a gravity reference for erecting the case about said axis, normally ineffective means for disabling said erecting means including a liquid level device carried by said case to sense horizontal components of acceleration athwartship of the craft and provide a corresponding electrical output, means for differentiating the output of said liquid level device providing a rate of change electrical output, and sequentially operable means for rendering said disabling means effective initially conditioned by the output of said differentiating means at a predetermined level and subsequently conditioned by the output of said liquid level device with the magnitude of the output thereof above a predetermined value.

12. In a reference system for dirigible craft, a gyro vertical with a universally supported rotor case having electrical erecting means including a torque motor and a gravitationally responsive device providing an electrical output in accordance with tilt of the case about an axis athwartship of the craft and connected by a circuit to the motor, a relay operable to disable the erecting means having a coil and a pair of ganged contact assemblies one of which provides a normally closed switch, a liquid level element mounted on the case to sense horizontal components of acceleration fore and aft of the craft and provide an electrical output, a relay operating circuit with a differentiator therein connecting the liquid level element and the relay coil, and a relay holding circuit between the liquid level element and the relay coil in which the other of the ganged assemblies provides a normally open switch.

13. A system of the character claimed in claim 12 in which said relay holding circuit includes a normally closed time delay switch.

References Cited in the file of this patent
UNITED STATES PATENTS

| | | |
|---|---|---|
| 2,450,320 | Wendt | Sept. 28, 1948 |
| 2,531,826 | Reichel | Nov. 28, 1950 |
| 2,716,894 | Nichols et al. | Sept. 6, 1955 |
| 2,848,898 | Waldow | Aug. 26, 1958 |